United States Patent
Mangal et al.

(10) Patent No.: US 12,043,252 B2
(45) Date of Patent: Jul. 23, 2024

(54) DRIVER TEMPORARY BLINDNESS EARLY WARNING AND AVOIDANCE RECOMMENDATION SYSTEM

(71) Applicant: APTIV TECHNOLOGIES LIMITED, St. Michael (BB)

(72) Inventors: Nandita Mangal, Los Altos, CA (US); Michael H. Laur, Mission Viejo, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 105 days.

(21) Appl. No.: 17/244,047

(22) Filed: Apr. 29, 2021

(65) Prior Publication Data
US 2022/0348195 A1 Nov. 3, 2022

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *B60W 30/14* (2013.01);
(Continued)

(58) Field of Classification Search
CPC ........... B60W 30/025; B60W 30/0956; B60W 30/12; B60W 30/14; B60W 40/02;
(Continued)

(56) References Cited

U.S. PATENT DOCUMENTS 6,811,201 B2 * 11/2004 Naik ................... B60J 3/0204
296/97.4
7,413,233 B1 8/2008 Jung
(Continued)

FOREIGN PATENT DOCUMENTS

DE 102008002541 A1 12/2009
DE 102018214938 A1 3/2020

OTHER PUBLICATIONS

European Patent Office, Extended European Search Report for EP Application 22170529.6, dated Mar. 17, 2023.

*Primary Examiner* — Russell Frejd
*Assistant Examiner* — Brandon Z Willis
(74) *Attorney, Agent, or Firm* — Miller Johnson

(57) ABSTRACT

An advanced driver assistance system (ADAS) and method for a vehicle include a light intensity detection system configured to detect a set of light density changes proximate to a face of a driver of the vehicle, a vehicle-to-everything (V2X) communication system, a global navigation satellite system (GNSS) system, and a controller configured to detect a current glare condition based on the set of detected light density changes from the light intensity detection system, share, using the V2X communication system, the detected current glare condition and the corresponding GNSS location, based on the sharing and another set of parameters, determine whether the vehicle is likely to experience a future glare condition during a future period, and in response to determining that the vehicle is likely to experience the future glare condition during the future period, at least one remedial action.

20 Claims, 2 Drawing Sheets

(51) Int. Cl.
  *B60W 30/14*  (2006.01)
  *B60W 50/00*  (2006.01)
  *B60W 50/14*  (2020.01)

(52) U.S. Cl.
  CPC ........ *B60W 50/0097* (2013.01); *B60W 50/14* (2013.01); *B60W 2420/40* (2013.01); *B60W 2420/403* (2013.01); *B60W 2540/225* (2020.02); *B60W 2554/406* (2020.02); *B60W 2555/20* (2020.02); *B60W 2556/50* (2020.02)

(58) Field of Classification Search
  CPC . B60W 2040/0872; B60W 2040/0818; B60W 2050/0071; B60W 50/0097; B60W 50/14; B60W 60/0015; B60W 60/0016; B60W 60/0051; B60W 2420/40; B60W 2420/42; B60W 2420/403; B60W 2540/225; B60W 2540/26; B60W 2554/406; B60W 2555/20; B60W 2556/45; B60W 2556/50; B60W 2556/65; G06V 20/597
  See application file for complete search history.

(56) References Cited

U.S. PATENT DOCUMENTS

| | | | |
|---|---|---|---|
| 8,589,034 | B2 | 11/2013 | Kwok |
| 8,841,592 | B1* | 9/2014 | Ho .......................... F24S 40/00 250/205 |
| 9,279,693 | B2* | 3/2016 | Hymel ............... G01C 21/3461 |
| 10,527,440 | B2* | 1/2020 | Yalla ...................... G06V 20/56 |
| 2017/0234689 | A1* | 8/2017 | Gibson ............. B60W 60/0015 701/25 |
| 2018/0053415 | A1* | 2/2018 | Krunic ................. G08G 1/0133 |
| 2018/0164107 | A1 | 6/2018 | Yalla |
| 2019/0318181 | A1* | 10/2019 | Katz ....................... G06F 3/012 |
| 2020/0105139 | A1 | 4/2020 | Krunic et al. |
| 2021/0300428 | A1* | 9/2021 | Stent .................... G06V 20/597 |

* cited by examiner

DRIVER TEMPORARY BLINDNESS EARLY WARNING AND AVOIDANCE RECOMMENDATION SYSTEM

FIELD

The present disclosure generally relates to vehicle advanced driver assistance systems (ADAS) and, more particularly, to a driver temporary blindness early warning and avoidance recommendation system.

BACKGROUND

A large number of "atmospheric condition" based vehicle crashes are caused by sun glare. This sun glare can be direct (i.e., coming directly from the sun) or indirect (e.g., sun glare reflected off of other objects/surfaces). During nighttime driving, bright lights (e.g., from other vehicles) can also create glare conditions similar to sun glare. When a driver experiences glare conditions, he/she could be temporarily blinded for a number of seconds before normal vision is regained. This period of temporary blindness also tends to increase with age. Conventional solutions to vehicle glare conditions include sun visors and solar shades. These solutions, however, are typically focused on mitigating direct light/sun glare conditions (i.e., not indirect or reflective light/sun glare conditions) and are only reactive in that they are actuated after the glare conditions are encountered. As a result, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an advanced driver assistance system (ADAS) for a vehicle is presented. In one exemplary implementation, the ADAS comprises a light intensity detection system configured to detect a set of light density changes proximate to a face of a driver of the vehicle, a vehicle-to-everything (V2X) communication system configured to communicate with other vehicles, a global navigation satellite system (GNSS) system configured to determine a GNSS location of the vehicle, and a controller configured to detect a current glare condition based on the set of detected light density changes from the light intensity detection system, share, using the V2X communication system, the detected current glare condition and the corresponding GNSS location, based on the sharing and another set of parameters, determine whether the vehicle is likely to experience a future glare condition during a future period, and in response to determining that the vehicle is likely to experience the future glare condition during the future period, at least one of (i) output a notification to the driver notifying them of the future glare condition, and (ii) at least partially takeover control of the vehicle during the future glare condition during the future period.

In some implementations, the light intensity detection system comprises a driver monitoring camera configured to capture and monitor images of the face of the driver. In some implementations, the light intensity detection system comprises vehicle photosensors. In some implementations, the current and future glare conditions are each indicative of excessive glare proximate to the face of the driver. In some implementations, the current GNNS location of the vehicle has a corresponding position on a map.

In some implementations, the at least partially taking over control of the vehicle comprises the controller performing at least one of lane centering and adaptive cruise control (ACC) during the future glare condition during the future period. In some implementations, the controller only at least partially takes over control of the vehicle when the driver fails to respond to the notification of the future glare condition. In some implementations, the other set of parameters comprises at least an expected route of the vehicle including a heading of the vehicle. In some implementations, the other set of parameters further comprises environmental conditions including at least one of a current time of day, a current time of year or current season, current weather conditions, and current traffic conditions.

According to another aspect of the present disclosure, a glare condition detection and mitigation method for a vehicle is presented. In one exemplary implementation, the method comprises detecting, by a controller of the vehicle, a current glare condition based on a set of detected light density changes from a light intensity detection system of the vehicle, wherein the light intensity detection system is configured to detect the set of light density changes proximate to a face of a driver of the vehicle, determining, by the controller of the vehicle, a current GNSS location of the vehicle from a GNSS system of the vehicle, sharing, by the controller and using a V2X communication system of the vehicle, the detected current glare condition and the corresponding GNSS location, wherein the V2X communication system is configured to communicate with other vehicles, based on the sharing and another set of parameters, determining, by the controller, whether the vehicle is likely to experience a future glare condition during a future period, and in response to determining that the vehicle is likely to experience the future glare condition during the future period, at least one of (i) outputting, by the controller of the vehicle, a notification to the driver notifying them of the future glare condition, and (ii) at least partially taking over, by the controller, control of the vehicle during the future glare condition during the future period.

In some implementations, the light intensity detection system comprises a driver monitoring camera configured to capture and monitor images of the face of the driver. In some implementations, the light intensity detection system comprises vehicle photosensors. In some implementations, the current and future glare conditions are each indicative of excessive glare proximate to the face of the driver. In some implementations, the current GNNS location of the vehicle has a corresponding position on a map.

In some implementations, the at least partially taking over control of the vehicle comprises the controller performing, by the controller, at least one of lane centering and ACC during the future glare condition during the future period. In some implementations, the controller only at least partially takes over control of the vehicle when the driver fails to respond to the notification of the future glare condition. In some implementations, the other set of parameters comprises at least an expected route of the vehicle including a heading of the vehicle. In some implementations, the other set of parameters further comprises environmental conditions including at least one of a current time of day, a current time of year or current season, current weather conditions, and current traffic conditions.

According to yet another aspect of the present disclosure, an ADAS for a vehicle is presented. In one exemplary implementation, the ADAS comprises a light intensity detection means for detecting a set of light density changes proximate to a face of a driver of the vehicle, a V2X communication means for communicating with other vehicles, a GNSS means for determining a GNSS location of the vehicle, and a controller means for detecting a current glare condition based on the set of detected light density changes from the light intensity detection system, sharing, using the V2X communication means, the detected current glare condition and the corresponding GNSS location, based on the sharing and another set of parameters, determining whether the vehicle is likely to experience a future glare condition during a future period, and in response to determining that the vehicle is likely to experience the future glare condition during the future period, at least one of (i) outputting a notification to the driver notifying them of the future glare condition, and (ii) at least partially taking over control of the vehicle during the future glare condition during the future period.

In some implementations, the light intensity detection system comprises (i) a driver monitoring camera configured to capture and monitor images of the face of the driver and (ii) vehicle photosensors, and the current and future glare conditions are each indicative of excessive glare proximate to the face of the driver, and the excessive glare comprises reflective glare and not direct sunlight.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, there exists an opportunity for improvement in the art of vehicle sun/light glare condition mitigation or avoidance. Accordingly, an improved vehicle advanced driver assistance system (ADAS) and a corresponding method are presented herein that proactively detect likely future glare conditions and at least one of (i) notify a driver of the vehicle of the future indirect glare conditions and (ii) at least partially takeover control of the vehicle during the future glare conditions for improved driver safety (i.e., because the temporary blindness may not be avoidable). These techniques utilize a light intensity monitoring system (e.g., a driver monitoring camera, one or more photosensor(s), or combinations thereof) to detect a glare condition based on detected light (e.g., reflected light) proximate to a face of the driver. This glare condition is shared/reported via a vehicle-to-everything (V2X) communication system (e.g., directly to other vehicles, to a central server, or combinations thereof) along with a corresponding global navigation satellite system (GNSS) location for aggregation such that glare zones or regions are identifiable relative to a map (e.g., a high-definition (HD) map). This can then be used to detect a glare condition that a vehicle is likely to experience during a future period. Remedial action can include providing a driver notification warning him/her of the upcoming glare condition and, in some cases, at least partially taking over control of the vehicle (e.g., an ADAS or autonomous driving feature) during the glare condition for improved safety (e.g., as the glare condition may be unavoidable).

Figure 1:
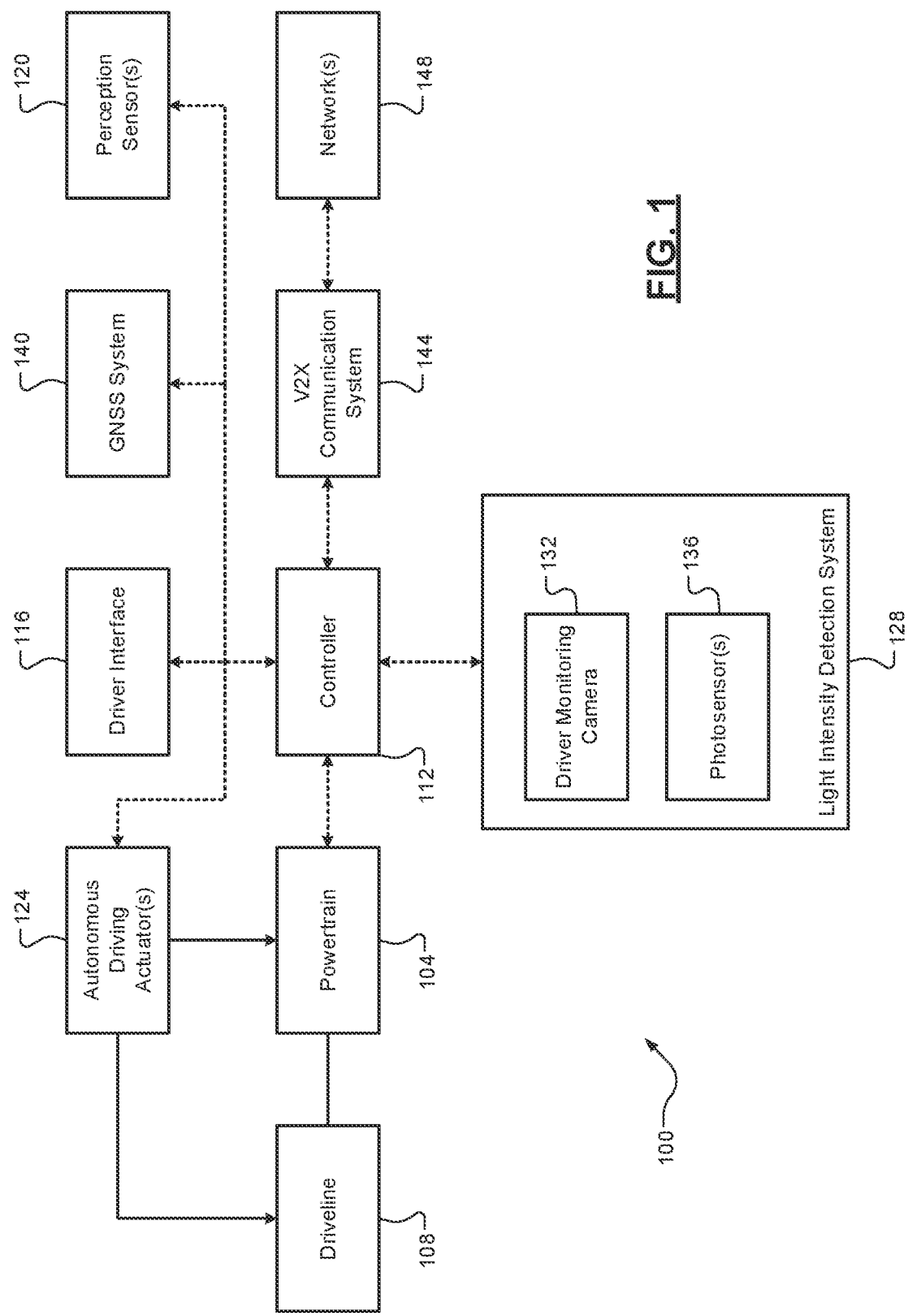
FIG. 1 is a functional block diagram of a vehicle having an example advanced driver assistance system (ADAS) for glare condition detection and avoidance according to the principles of the present disclosure.

Referring now to FIG. 1, a functional block diagram of a vehicle 100 having an example advanced driver assistance system (ADAS) for glare condition detection and avoidance according to the principles of the present disclosure is illustrated. The vehicle 100 comprises a powertrain 104 (e.g., an engine, an electric motor, or some combination thereof in addition to a transmission) configured to generate and transfer drive torque to a driveline 108 for vehicle propulsion. A controller 112 controls operation of the vehicle 100, including controlling the powertrain 104 to generate a desired amount of drive torque (e.g., based on driver input via a driver interface 116, such as an accelerator pedal). The vehicle 100 is configured to perform at least one ADAS or autonomous driving feature. Non-limiting examples of this ADAS/autonomous driving functionality include lane keeping/centering and adaptive cruise control (ACC). It will be appreciated that the vehicle 100 could be configured to perform other ADAS/autonomous driving features, including up to L4-L5 fully-autonomous driving. The ADAS/autonomous driving feature is generally executed based on input from a set of perception sensor(s) 120 (camera(a), RADAR, LIDAR, GNSS, inertial measurement unit (IMU), map as a sensor, etc.) that are used by the controller 112 to automatically control a set of autonomous driving actuators 124 (accelerator, brakes, steering, etc.). The controller 112 is also configured to perform at least a portion of the glare detection and avoidance techniques of the present disclosure, which will now be discussed in greater detail.

The vehicle 100 further comprises a light intensity detection system 128 that is configured to detect changes in light intensity proximate to a face of the driver of the vehicle 100. Non-limiting examples of the components of the light intensity detection system 128 include a driver monitoring camera 132 and photosensor(s) 136. These devices 132, 136 are each capable of detecting light density changes proximate to the face of the driver. It will be appreciated that the light intensity detection system 136 could further comprise exterior photosensor(s) configured to detect light intensity changes external to the vehicle 100. Based on the light density changes proximate to the face of the driver as monitored by the light intensity detection system 128, a glare condition could be detected. Indirect glare differs from direct glare (direct sunlight or other light) in that is reflective off of other surfaces and therefore is difficult to anticipate based on a variety of variable conditions). This could occur, for example, when the detected light density changes exceed a calibratable threshold (e.g., indicative of what an average driver would find uncomfortable or impairing to their driving). When this glare condition is detected, it can be reported/shared, along with a corresponding GNSS location (e.g., determined using GNSS system 140, IMU, HD map, perception sensors, etc.), with other vehicles for aggregation and improved safety amongst a group of vehicles. In addition, the map is an important feature because it provides a relative location to infrastructure that may be beyond perception sensor range (e.g., infrastructure that could be causing glare). Also knowing where the vehicle 100 is relative to a map (e.g., lane, heading of lane, etc.) could be slightly different than that determined by GNSS and heading from GNSS. This is because a map will have both global accuracy and relative accuracy. Relative accuracy to map infrastructure can be more precise.

This could include direct vehicle-to-vehicle sharing and/or sharing/uploading to a central server. This sharing is performed using a type of V2X communication system 144 and one or more networks 148 (short-range wireless, cellular, etc.). For example, the central server could be associated with an original equipment manufacturer (OEM) of a plurality of different vehicles or a supplier of the ADAS system to a plurality of different vehicles/OEMs. The aggregate sharing of glare conditions and corresponding GNSS locations by various vehicles allows for the annotation of glare areas or regions on a map (e.g., an HD lane level map). In some implementations, annotation could only occur when the number of reported instances of a glare condition at a particular GNSS location or in a particular area/region exceeds a calibratable threshold (e.g., to prevent from one false positive report). This information can then be distributed/shared with other vehicles and used for the anticipation of likely future glare conditions. This likelihood can be determined based on various operating parameters, such as a current heading of the vehicle, time of day, time of year, speed of vehicle, cloud cover, roadway lane, a programmed navigation route, and the like. Various remedial actions could then be taken, such as the controller 112 outputting a notification to the driver via the driver interface 112 (an audible, visual, and/or tactile/haptic warning). In some cases, the remedial action could include at least partially taking over control of the vehicle 100 (via an ADAS/autonomous driving feature, such as lane centering and ACC, lane change, etc.) during the glare condition for improved safety (e.g., because the glare condition may be unavoidable, which could leave the driver temporary blind at the wheel). This could occur, for example only, when the driver fails to respond to the glare condition notification or the vehicle trajectory indicates a beyond threshold probability that the vehicle 100 will depart a safe trajectory when glare is encountered or anticipated.

Figure 2:
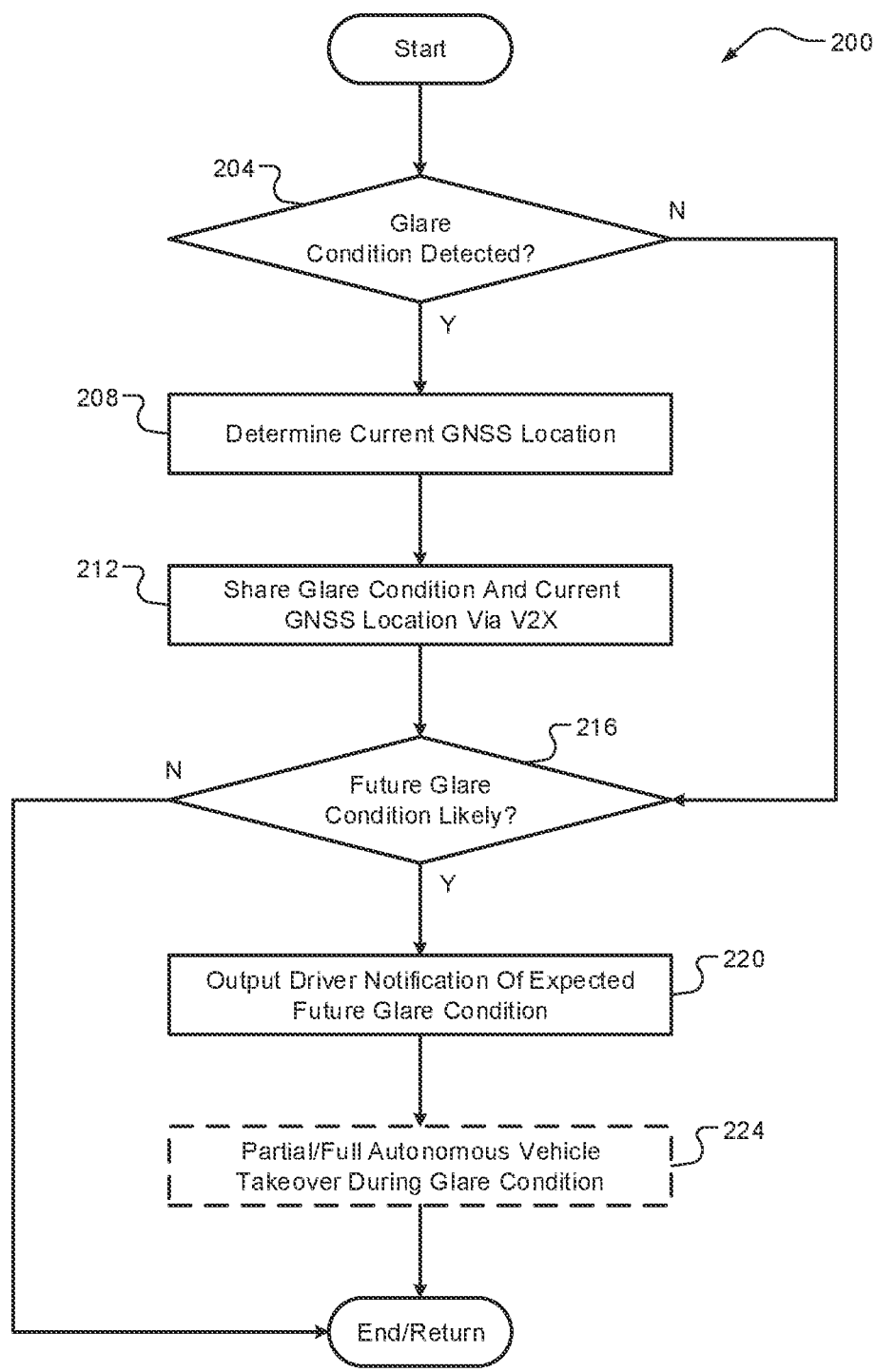
FIG. 2 is a flow diagram of an example glare condition detection and avoidance method for a vehicle having an advanced driver assistance system (ADAS) according to the principles of the present disclosure.

Referring now to FIG. 2, a flow diagram of an example glare condition detection and avoidance method 200 for a vehicle having an ADAS according to the principles of the present disclosure is illustrated. While the vehicle 100 and its components are specifically referenced for purposes of this disclosure, it will be appreciated that this method 200 could be applicable to any suitable vehicle. At 204, the controller 112 determines whether a glare condition is detected using the light intensity detection system 128. When true, the method 200 proceeds to 208. Otherwise, the method 200 proceeds to 216. At 208, the controller 112 determines the current GNSS location of the vehicle 100 using the GNSS system 140. At 212, the controller 112 shares the detected glare condition and the corresponding GNSS location using the V2X communication system 144. At 216, the controller 112 determines whether a future glare condition is likely (e.g., greater than a threshold likelihood expected glare condition). As previously discussed, a plurality of different parameters could be taken into account in determining whether the vehicle 100 is likely to encounter a future glare condition. This typically includes at least an expected route of the vehicle 100 (e.g., programmed into a navigation system) and, more particularly, a heading of the vehicle 100. Other parameters taken into account could include environmental conditions including at least one of a current time of day, a current time of year or current season, current weather conditions, current traffic conditions, current lane, and the like. For example, the time/season could be indicative of the state of the sun (sunrise/sunset) or nighttime driving conditions and weather/traffic conditions could indicate whether precipitation (rain, snow, etc.) and other vehicles could potentially cause reflective glare. When false, the method 200 ends or returns to 204 for continued monitoring/reporting.

When true, however, the method 200 proceeds to 220. At 220, the controller 112 outputs a driver notification of the expected/likely future glare condition before it actually occurs. As previously discussed, this could be some sort of audible, visual, and/or tactile/haptic warning. At optional 224, the controller 112 could at least partially takeover control of the vehicle 100 during the future glare condition. In some cases, this would occur when the driver fails to respond to the previously-provided notification. This at least partial takeover could include executing an ADAS/autonomous driving feature (lane centering, ACC, some combination thereof, etc.). The method 200 then ends or returns to 204 for continued monitoring/reporting. As previously mentioned, while sunlight and reflected sunlight is generally described herein, it will be appreciated that direct/indirect glare could occur from any light source, such as vehicle headlights or road lights during nighttime driving. Thus, the techniques of the present disclosure are also applicable to glare conditions caused by non-sunlight sources, and thus could be particularly useful during nighttime driving scenarios when it could be even more difficult for a driver to anticipate an upcoming or imminent glare condition. In addition, while driver warnings and safe vehicle control during the glare conditions are specifically described herein as remedial actions, it will be appreciated that other remedial actions could be taken. For example, the driver notification of the future glare condition could cause the driver to change his/her route to avoid the glare area/region, or this notification could include explicit instructions/navigation to avoid the glare area/region.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An advanced driver assistance system (ADAS) for a vehicle, the ADAS comprising:
   a light intensity detection system arranged within a cabin of the vehicle and configured to detect a set of light density changes proximate to a face of a driver of the vehicle that are indicative of indirect glare where light is being reflected off of a surface external to the vehicle;
   a vehicle-to-everything (V2X) communication system configured to communicate with other vehicles;
   a global navigation satellite system (GNSS) system configured to determine a GNSS location of the vehicle; and a controller configured to:
  detect a current indirect glare condition based on the set of light density changes from the light intensity detection system;
  determine a structure having the surface that is a source of the current indirect glare condition and a GNSS location of the structure using the GNSS location of the vehicle and a maps database;
  share, using the V2X communication system, the current indirect glare condition and its source structure and the GNSS location of the structure;
  receive, via the V2X communication system, an indication that a second indirect glare condition exceeds a threshold quantity from a set of nearby vehicles;
  in response to receiving the indication that the second indirect glare condition exceeds the threshold quantity, annotate a glare area on a map;
  based on the sharing and a set of parameters, determine whether the vehicle is likely to experience a future indirect glare condition during a future period at the glare area on the map; and
  in response to determining that the vehicle is likely to experience the future indirect glare condition during the future period, at least one of:
    (i) output a notification to the driver notifying them of the future indirect glare condition, and
    (ii) at least partially takeover control of the vehicle during the future indirect glare condition during the future period.

2. The ADAS of claim 1, wherein the light intensity detection system comprises a driver monitoring camera configured to capture and monitor images of the face of the driver.

3. The ADAS of claim 1, wherein the light intensity detection system comprises vehicle photosensors.

4. The ADAS of claim 1, wherein the current indirect glare condition and future indirect glare condition are each indicative of excessive indirect glare proximate to the face of the driver.

5. The ADAS of claim 1, wherein the at least partially taking over control of the vehicle comprises the controller performing at least one of lane centering and adaptive cruise control (ACC) during the future indirect glare condition during the future period.

6. The ADAS of claim 1, wherein the controller only at least partially takes over control of the vehicle when the driver fails to respond to the notification of the future indirect glare condition.

7. The ADAS of claim 1, wherein the set of parameters comprises at least an expected route of the vehicle including a heading of the vehicle.

8. The ADAS of claim 7, wherein the set of parameters further comprises environmental conditions including at least one of a current time of day, a current time of year or current season, current weather conditions, and current traffic conditions.

9. The ADAS of claim 1, wherein the set of light density changes are not direct glare directly from a light source.

10. An indirect glare condition detection and mitigation method for a vehicle, the method comprising:
  detecting, by a controller of the vehicle, a current indirect glare condition based on a set of light density changes from a light intensity detection system arranged within a cabin of the vehicle, wherein the light intensity detection system is configured to detect the set of light density changes proximate to a face of a driver of the vehicle that are indicative of indirect glare where light is being reflected off of a surface external to the vehicle;
  determining, by the controller of the vehicle, a current global navigation satellite system (GNSS) location of the vehicle from a GNSS system of the vehicle;
  determining, by the controller, a structure having the surface that is a source of the current indirect glare condition and a GNSS location of the structure using the GNSS location of the vehicle and a maps database;
  sharing, by the controller and using a vehicle-to-everything (V2X) communication system of the vehicle, the current indirect glare condition and its source structure and the GNSS location of the structure, wherein the V2X communication system is configured to communicate with other vehicles;
  receiving, via the V2X communication system, an indication that a second indirect glare condition exceeds a threshold quantity from a set of nearby vehicles;
  in response to receiving the indication that the second indirect glare condition exceeds the threshold quantity, annotating a glare area on a map;
  based on the sharing and a set of parameters, determining, by the controller, whether the vehicle is likely to experience a future indirect glare condition during a future period at the glare area on the map; and
  in response to determining that the vehicle is likely to experience the future indirect glare condition during the future period, at least one of:
    (i) outputting, by the controller of the vehicle, a notification to the driver notifying them of the future indirect glare condition, and
    (ii) at least partially taking over, by the controller, control of the vehicle during the future indirect glare condition during the future period.

11. The method of claim 10, wherein the light intensity detection system comprises a driver monitoring camera configured to capture and monitor images of the face of the driver.

12. The method of claim 10, wherein the light intensity detection system comprises vehicle photosensors.

13. The method of claim 10, wherein the current indirect glare condition and future indirect glare condition are each indicative of excessive indirect glare proximate to the face of the driver.

14. The method of claim 10, wherein the at least partially taking over control of the vehicle comprises the controller performing, by the controller, at least one of lane centering and adaptive cruise control (ACC) during the future indirect glare condition during the future period.

15. The method of claim 10, wherein the controller only at least partially takes over control of the vehicle when the driver fails to respond to the notification of the future indirect glare condition.

16. The method of claim 10, wherein the set of parameters comprises at least an expected route of the vehicle including a heading of the vehicle.

17. The method of claim 16, wherein the set of parameters further comprises environmental conditions including at least one of a current time of day, a current time of year or current season, current weather conditions, and current traffic conditions.

18. The method of claim 10, wherein the set of light density changes are not direct glare directly from a light source.

19. An advanced driver assistance system (ADAS) for a vehicle, the ADAS comprising:

means, arranged within a cabin of the vehicle, for detecting a set of light density changes proximate to a face of a driver of the vehicle that are indicative of indirect glare where light is being reflected off of a surface external to the vehicle;

means for communicating with other vehicles; and means for determining a global navigation satellite system location of the vehicle; and means for:

detecting a current indirect glare condition based on the set of light density changes from the means for detecting the set of light density changes proximate to the face of the driver of the vehicle;

determining a structure having the surface that is a source of the current indirect glare condition and a GNSS location of the structure using the GNSS location of the vehicle and a maps database;

sharing, using the means for communicating with other vehicles, the current indirect glare condition and its source structure and the GNSS location of the structure;

receiving, using the means for communicating with other vehicles, an indication that a second indirect glare condition exceeds a threshold quantity from a set of nearby vehicles;

in response to receiving the indication that the second indirect glare condition exceeds the threshold quantity, annotating a glare area on a map;

based on the sharing and a set of parameters, determining whether the vehicle is likely to experience a future indirect glare condition during a future period at the glare area on the map; and in response to determining that the vehicle is likely to experience the future indirect glare condition during the future period, at least one of:

outputting a notification to the driver notifying them of the future indirect glare condition, and at least partially taking over control of the vehicle during the future indirect glare condition during the future period.

20. The ADAS of claim 19, wherein the set of light density changes are not direct glare directly from a light source.

* * * * *